United States Patent [19]
Gelbart

[11] Patent Number: 6,121,996
[45] Date of Patent: Sep. 19, 2000

[54] LASER RECORDING METHOD

[75] Inventor: Daniel Gelbart, Vancouver, Canada

[73] Assignee: Creo SRL, Burnaby, Canada

[21] Appl. No.: 09/072,739

[22] Filed: May 4, 1998

[51] Int. Cl.[7] .............................. G03B 27/32; H04N 1/00
[52] U.S. Cl. ...................... 347/241; 347/251; 347/256; 347/262; 355/18
[58] Field of Search .................... 355/18, 67, 38, 355/50; 347/241, 251, 252, 256, 258, 238, 239, 240, 262, 110; 359/205, 207; 396/548; 358/298; 430/302

[56] References Cited

U.S. PATENT DOCUMENTS

| | | | |
|---|---|---|---|
| 4,025,189 | 5/1977 | Pugsley | 355/38 |
| 4,468,442 | 8/1984 | Sakamoto | 355/68 |
| 4,623,972 | 11/1986 | Darby et al. | 358/298 |
| 5,309,178 | 5/1994 | Gross | 347/238 |
| 5,818,645 | 10/1998 | Whaley et al. | 359/668 |
| 5,861,992 | 1/1999 | Gelbart | 359/619 |
| 5,923,358 | 7/1999 | Yamakawa | 347/238 |

FOREIGN PATENT DOCUMENTS

WO 95/18984  7/1995  WIPO ........................... G02B 27/00

*Primary Examiner*—Alan A. Mathews
*Attorney, Agent, or Firm*—Oyen Wiggs Green & Mutala

[57] ABSTRACT

A square laser recording spot, having an energy profile with a very sharp transition between the writing and non-writing area in both dimensions, is created by a shaping the laser energy into a line narrower than the desired spot size and scanning this line to create a square spot. The sharp transition resists changes in the writing process which could vary the size of the mark created by the spot. The square shape of the mark avoids dot gain and eliminates the need for dot gain calibration.

16 Claims, 2 Drawing Sheets

LASER RECORDING METHOD

FIELD OF INVENTION

The invention relates to laser recording, and more particularly to recording a mark while the material being recorded is moving relative to the laser spot.

BACKGROUND OF THE INVENTION

In laser recording it is desired to mark a light or heat sensitive material with a well defined mark. This is particularly important in the field of graphic arts and in particular in exposing of halftone materials such as printing plates. The amount of ink carried by a printing plate is related to the size of the marks making up the image on the plate. The more abrupt the transition of the laser spot marking the material the more consistent the mark size is. Theoretically, for an infinitely sharp transition at the edge of the laser spot the mark size will not change even if the marking threshold or laser energy changes. Since most recording methods require continuous relative motion between the laser spot and the material being marked, the sharpness of the transition in the laser energy forming the mark is affected by the smearing of the edge of the mark. This is known as "motion blur" and the problem is similar to the blur occurring when taking a picture of a moving object with a camera having a long exposure time. The same way that the camera problem can be solved by using a strobe light, the laser recording motion blur can be solved by pulsing the laser. This solution, however, is not practical as it lowers the energy delivered by the laser. It should be noted that even when a high contrast material is being used and the motion blur is not evident by looking at the recorded mark, the negative effects of this blur on the stability and uniformity of the mark are still there.

The problem of lost sharpness caused by motion blur becomes evident by referring to FIGS. 1a and 1b, which shows the prior art. A laser spot S having sharp (i.e. nearly square) transitions 1 is imaged for a time on a moving material 3 by lens 2 to make a mark on material 3. At any instant the energy profile of the imaged spot 4 has sharp transitions similar to the transitions 1 of spot S (within the limitations imposed by the performance of lens 2). The accumulated energy forming the mark is the sum of multiple profiles, spread over an area of the mark. At the instant at which writing the mark begins the energy is distributed as shown by curve 5 and at the instant at which writing the mark ends the energy is represented by curve 4, as material 3 has moved. Summing all these profiles gives the total energy curve 6, which no longer has a sharp transition.

Referring now to FIG. 1b, the size of the mark made on material 3 will depend on the location of the marking threshold relative to curve 6. Where material 3 has a threshold at the energy level indicated by line 7 the mark size is "a". While the mark size will change to "b" if material 3 has a threshold at the energy level indicated by line 8. Both mark "a" and "b" can be very sharp, if material 3 is high contrast material, but the size of the mark will not be stable.

All prior art exposure systems, even those which use square spots, are subject to this deficiency. An example of using square spots to image half-tone images is shown in U.S. Pat. No. 4,025,189 and the triangular profile resulting from a square spot is shown in FIGS. 7-c to 7-e of that patent. Other methods of forming a square laser spot are disclosed in PCT patent application WO 95/18984. This disclosure teaches the generation of a square laser spot but cannot generate an exposure function on the material having a square energy profile due to the "motion blur". It is an object of the invention to generate a square mark created by a square energy distribution, having a sharp transition of the exposing energy at all four sides of the square mark. This square mark can serve as a basic picture element, or pixel, for the construction of images, and in particular half-tone images as used in the graphic arts. By making the size of the square equal to the resolution of the image (i.e. no overlap between squares) the problem known as "dot gain" in graphic arts is eliminated. Square spots created according to the invention have a high degree of immunity to any changes in the imaging process. It is another object of the invention to image light or heat sensitive material in a way requiring a minimum of calibration, particularly when half-tone images are being created.

SUMMARY OF THE INVENTION

A square laser recording spot having a very sharp energy transition at all four edges is created by shaping laser energy into a line. The length of the line is equal to the width of the recorded spot while the width of the line is narrower than the length of the recorded spot in the direction of relative motion between the line and the material being recorded. By scanning the line a square spot is created having a sharp energy transition at all four edges. Such a spot resists changes in the writing process which could vary the size of the mark created by the laser. The square shape of the mark also allows recording without overlapping laser spots, eliminating calibration for dot gain which results from overlapping. It is also clear that while a square mark is preferred, the invention applies equally to any shape of mark and the term "square" should be understood broadly to include rectangular or other shaped marks.

DESCRIPTION OF THE DRAWINGS

FIG. 1-b shows a cross section of the energy profile produced by the prior art recording process of FIG. 1-a.

FIG. 2-b shows a cross section of the energy profile produced through use of the invention.

DESCRIPTION OF THE PREFERRED EMBODIMENT

Figure 1A:
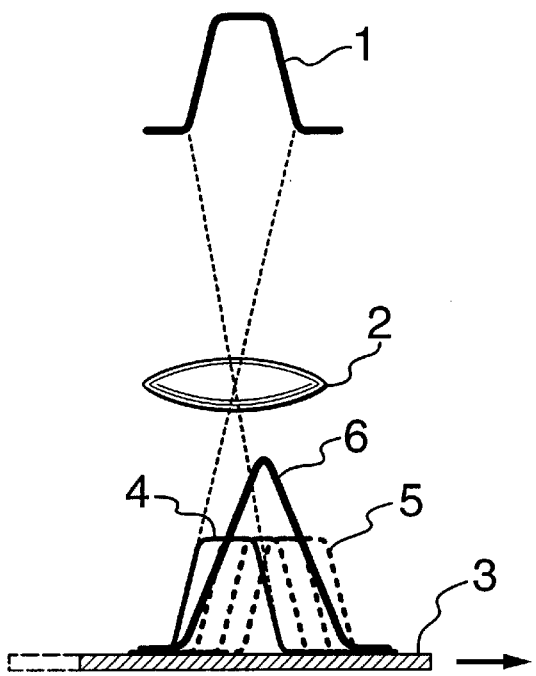
FIG. 1-a shows a cross section of apparatus being used in a recording process.
Figure 1B:
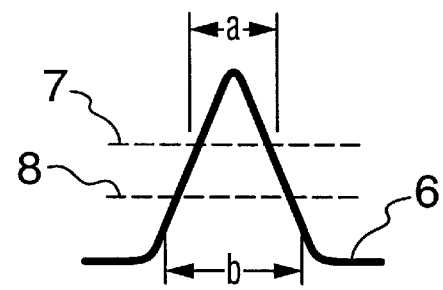
Figure 2A:
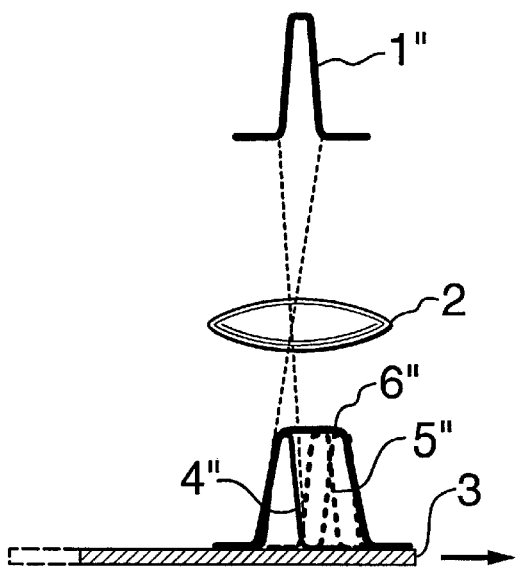
FIG. 2-a shows a cross section of apparatus practising a recording process according to the invention.
Figure 2B:
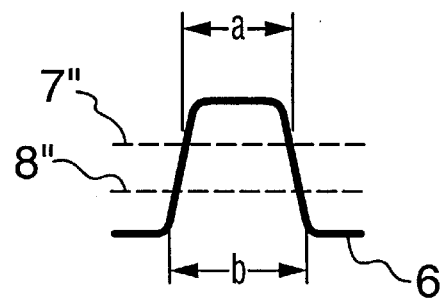

The invention permits the use of a laser to generate a mark having sharp transitions at all of its edges, even when relative motion exists between the laser spot and the material being marked for the duration of the marking. In general the mark is the smallest picture element, also known as "pixel" or "pel". The laser is shaped into a line having a cross section shown by shape 1' of FIG. 2-a. FIG. 2-a is a cross-section through a piece of material 3 being marked according to the invention taken in the direction of the relative motion. The width of shape 1' has to be less than the length of the desired mark in the direction of the relative motion. Typically the width of shape 1' should be from 10% to 50% of the width of the desired mark. The laser line is imaged by lens 2 onto material 3. As the image of the laser line is scanned across material 3 (by the relative motion) the image moves from position 5' to position 4' during the duration of writing the mark. The sum of the exposure generates energy profile 6'. If width of shape 1' were zero, the shape of energy profile 6 would be perfectly square. Because of physical limits, shape 1' has a finite width, which determines the transition time (also know as "optical rise time") of profile 6. For a line having a cross-sectional shape 1' with a width significantly less than the width of the desired profile 6', an exposure function immune to process changes is created. This is shown in FIG. 2-b. When threshold at which material 3 becomes marked changes from an energy density indicated by line 7' to a lower energy density indicated by line 8', the size of the mark changes from "a" to "b". This change is much less than in prior art exposure systems and allows superior control of the imaging process.

Figure 3:
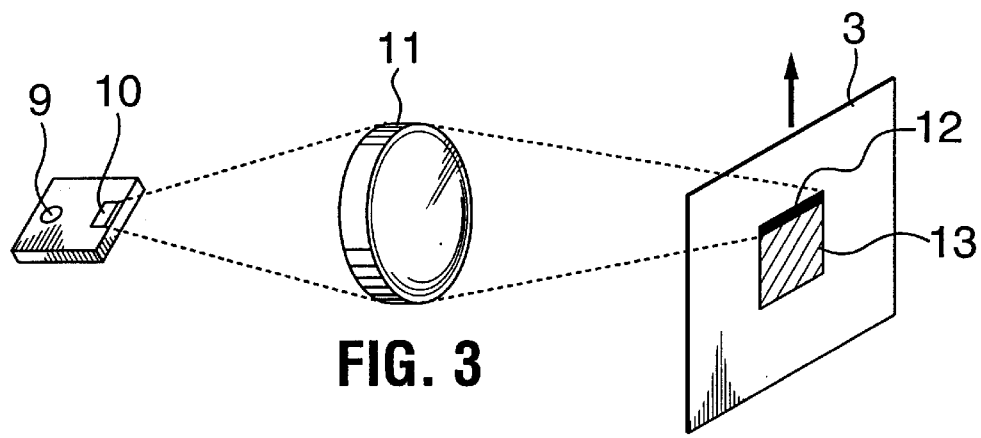
FIG. 3 shows the generation of square spots by imaging a laser diode facet.
Figure 4:
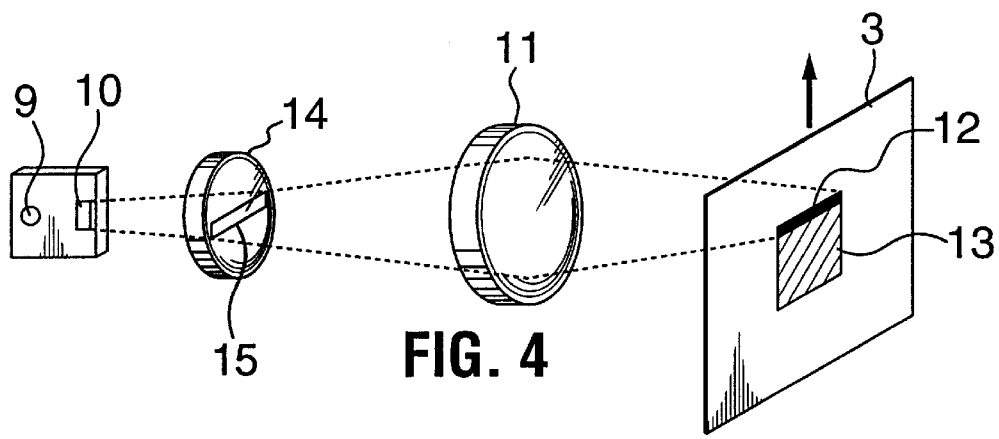
FIG. 4 shows the generation of square spots by imaging the far-field pattern of a laser diode.
Figure 5:
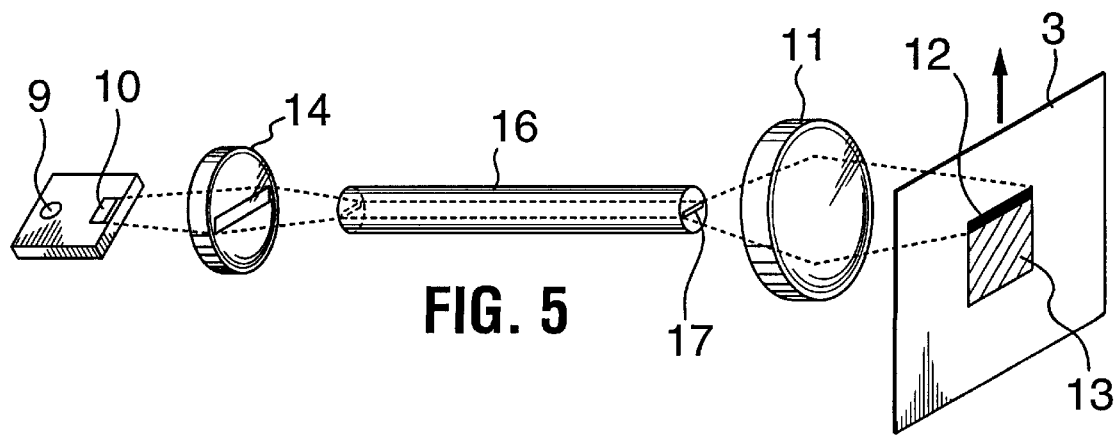
FIG. 5 shows the generation of square spots by imaging an optical fiber having a rectangular core.

The invention can be implemented in many different ways, three of them are shown in FIG. 3 to FIG. 5. In FIG. 3 a narrow line is generated by directly imaging a linear light source onto the recorded material. The linear light source can be the emitter (facet) 10 of multi-mode laser diode 9, imaged into line 12 by lens 11. Scanning line 12 for the duration of one pixel on material 3 creates a square spot 13 with a sharp transition in the energy profile on all four sides. Clearly any linear light source such as a linear light bulb or a linear light valve can be substituted for laser diode 9. One disadvantage of this method is that any non-uniformity in emitter 10 will be reproduced in line 12. A different method, with more immunity to non-uniformity of the laser emitter is shown in FIG. 4. Instead of imaging the emitter 10 directly, the far field pattern 15 of the emitter, as formed on collection lens 14 is imaged into line 12.

A third way of generating a line image is shown in FIG. 5. Laser diode 9 is coupled into optical fiber 16 using conventional means such as a lens 14. Fiber 16 has a rectangular core 17. The illuminated end of core 17 is imaged by a lens 11 onto material 3 to form line 12 and square spot 13. The advantage of this method is high degree immunity to non-uniformity in the radiation pattern of laser 9. A further advantage is the higher coupling efficiency achieved when coupling a rectangular emitter into a rectangular fiber core, compared to prior art of coupling a rectangular emitter into a round core. Rectangular core fibers are manufactured by the same process as round core fibers, by starting with a preform having a rectangular core. While laser 9 in FIGS. 3–5 can be at any wavelength the invention is particularly useful in thermal recording using near IR lasers.

What is claimed is:

1. A method for creating a mark on a material, the material being of a type which undergoes a change upon exposure to laser energy, the method comprising:
  a) providing a laser and a material having a surface;
  b) operating the laser to illuminate a surface of the material with a narrow substantially continuous line of laser radiation; and,
  creating relative motion between the material and the laser line in a direction substantially transverse to an orientation of the line so that the line sweeps over a region on the material and changes a property of the material in the region.

2. The method of claim 1 wherein the region on the material is rectangular.

3. The method of claim 2 wherein the region on the material is square.

4. The method of claim 2 wherein the line has a width which is no more than 50% of a width of the rectangle.

5. The method of claim 4 wherein the line has a width which is in the range of 10% to 50% of the width of the rectangle.

6. The method of claim 1 wherein illuminating the material with a narrow line of laser radiation comprises generating a beam of laser radiation and shaping the beam to provide a narrow line of laser radiation impinging on the surface of the material.

7. The method of claim 6 wherein shaping the beam comprises passing the beam into an optical fiber having a rectangular core and imaging an illuminated rectangular end of the rectangular core on the surface of the material.

8. The method of claim 7 wherein the laser comprises a rectangular emitter.

9. The method of claim 6 wherein shaping the beam comprises illuminating a linear light valve with the beam and imaging the illuminated linear light valve on the surface of the material.

10. The method of claim 6 wherein the light source is elongated and shaping the beam comprises imaging an emitter of the laser with a lens to create a far-field pattern and imaging the far-field pattern onto the surface of the material.

11. The method of claim 1 wherein the laser is an IR laser and the material is a thermal recording material.

12. The method of claim 1 wherein the laser has a linear emitter and illuminating a surface of the material with a narrow line of laser radiation comprises imaging the linear emitter of the laser onto the surface of the material.

13. A method for writing a pixel having parallel first and second edges on a material to be imaged, the method comprising:
  a) providing a light source and a material on which it is desired to write an image;
  b) providing an optical system for focussing the light source onto a line on the surface of the material, the line having a width and first and second ends substantially coincident with the first and second edges of the pixel respectively;
  c) operating the light source to illuminate the line when the line is substantially coincident with a third edge of the pixel;
  d) creating relative motion between the line and the material in a direction parallel to the first and second edges of the pixel and thereby sweeping the line across an area of the pixel; and,
  e) ceasing to illuminate the line when the line is substantially coincident with a fourth edge of the pixel;
wherein the width of the line is no more than 50% of a distance between the third and fourth edges of the pixel.

14. The method of claim 13 wherein, when the line is substantially coincident with the fourth edge of the pixel, the line does not substantially overlap with another pixel adjacent the fourth edge of the pixel.

15. The method of claim 13 wherein the line is substantially perpendicular to the first and second edges and the pixel is rectangular.

16. The method of claim 15 wherein the pixel is square.

* * * * *